D. F. ASBURY.
CHAIN RAMMER.
APPLICATION FILED AUG. 19, 1909.
980,181.
Patented Jan. 3, 1911.
5 SHEETS—SHEET 5.
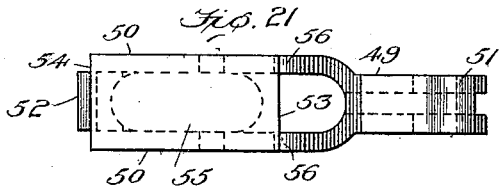
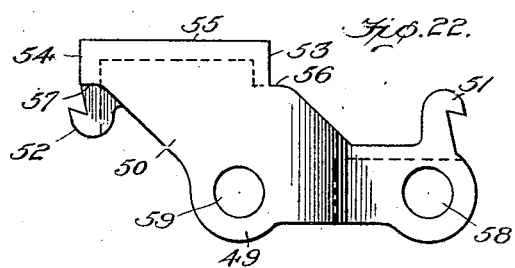
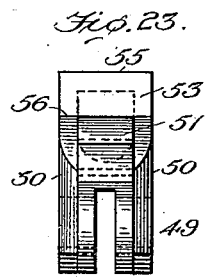
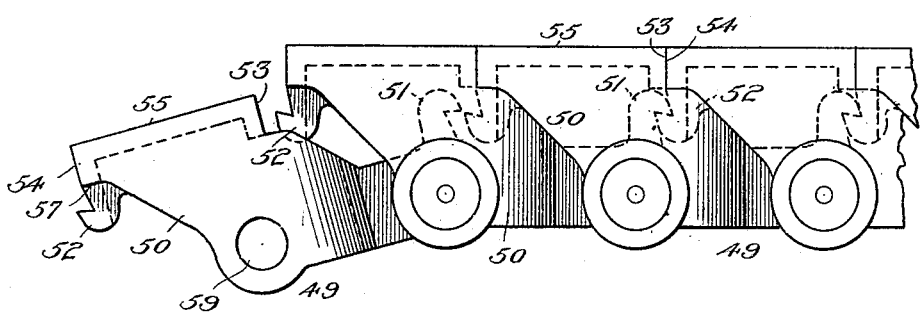
Witnesses
Inventor
Darcey F. Asbury

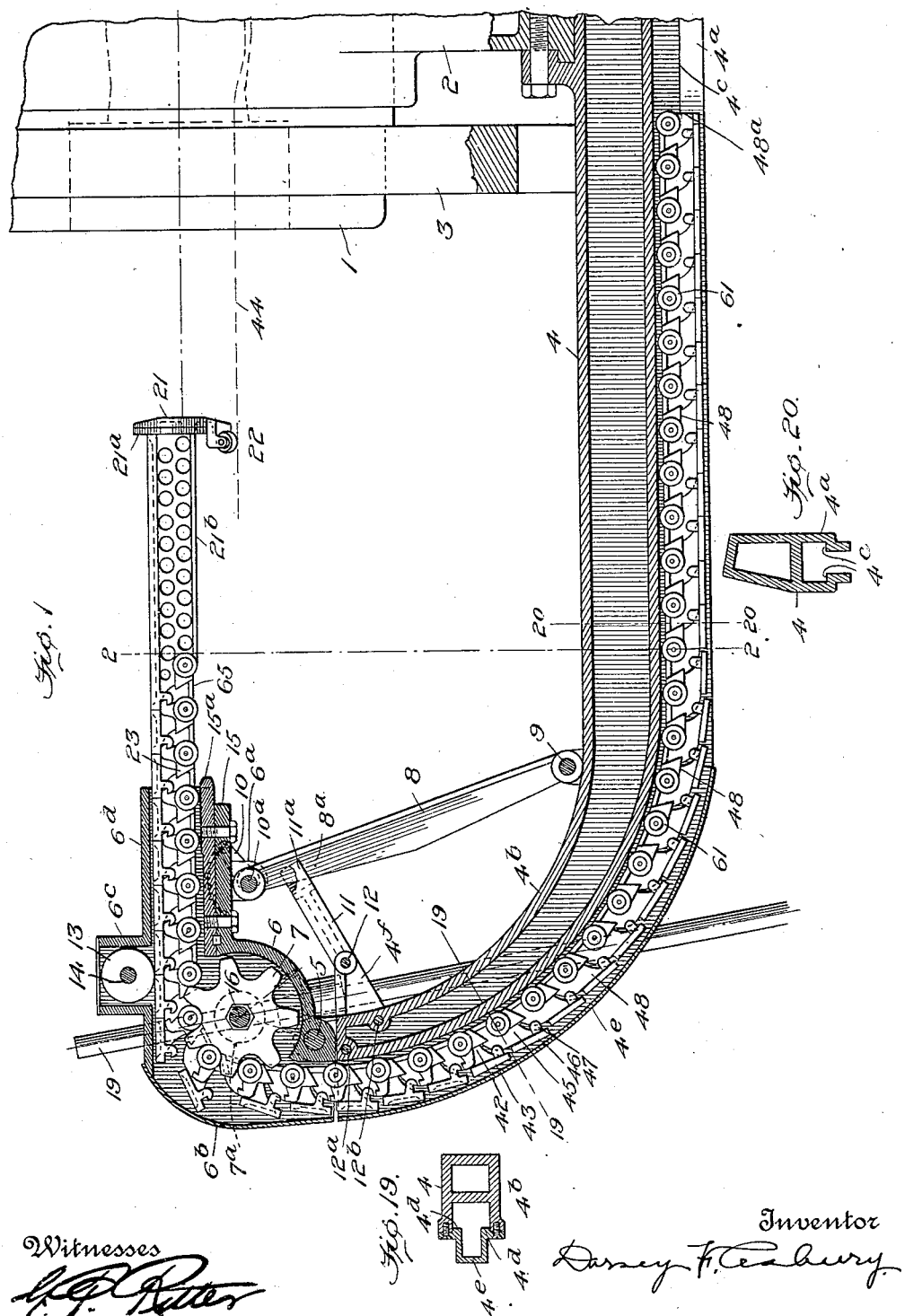

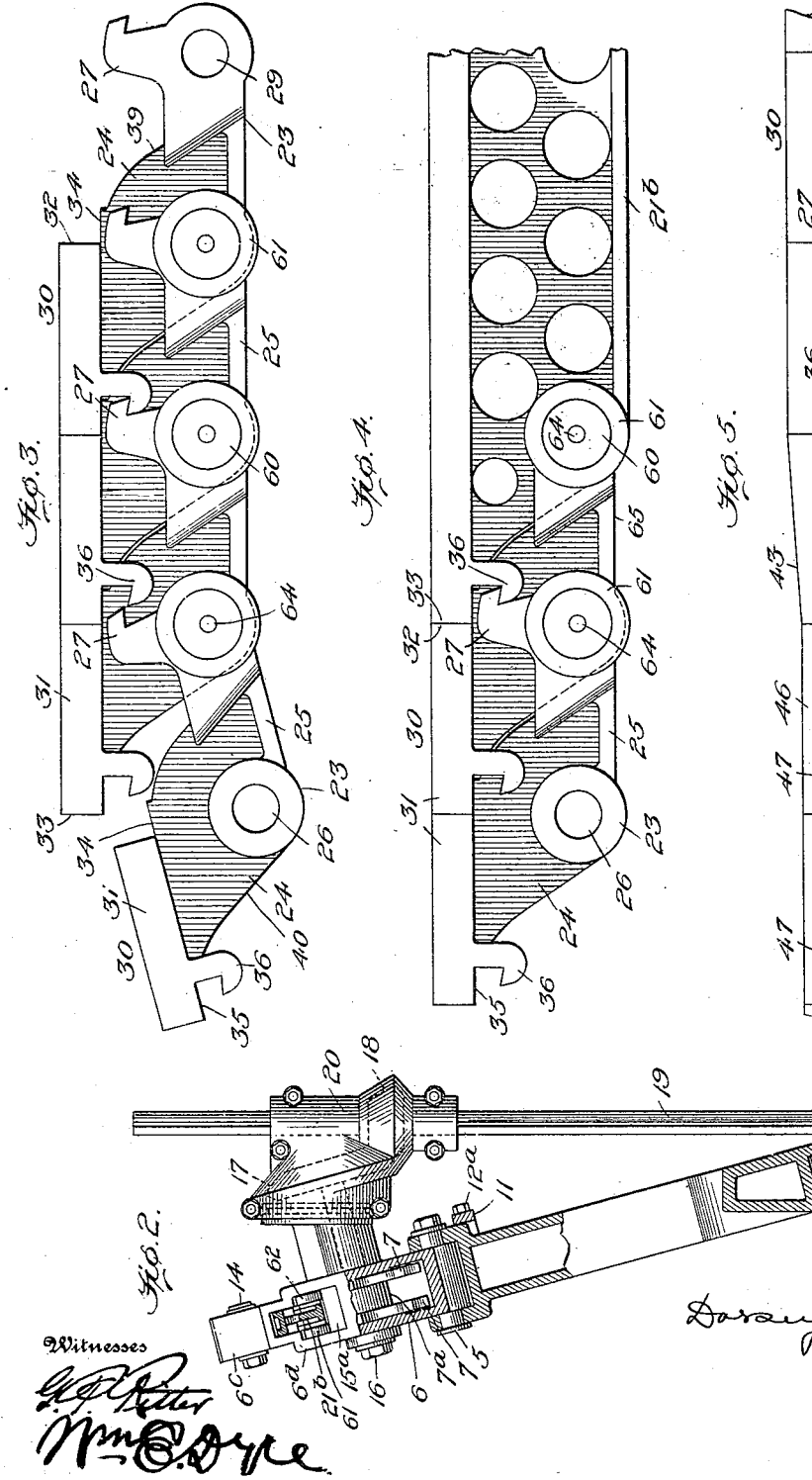

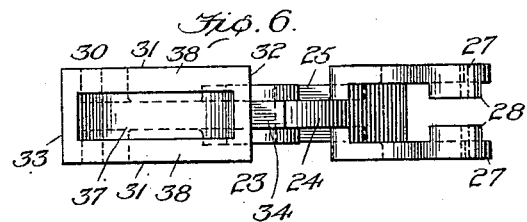
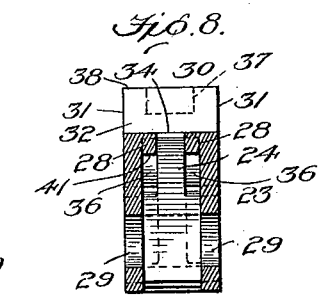
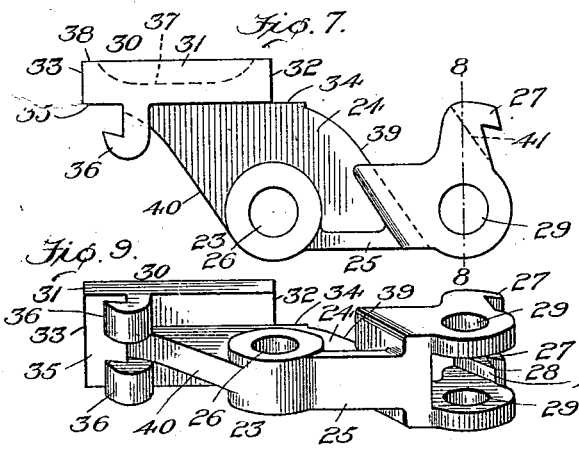
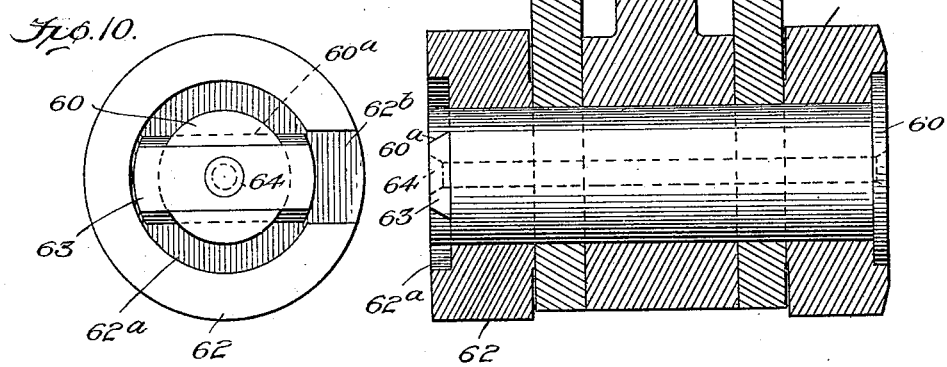

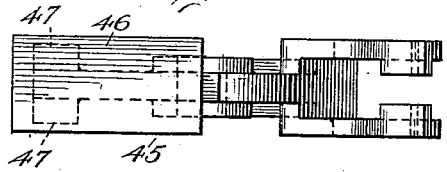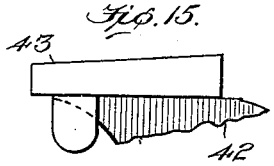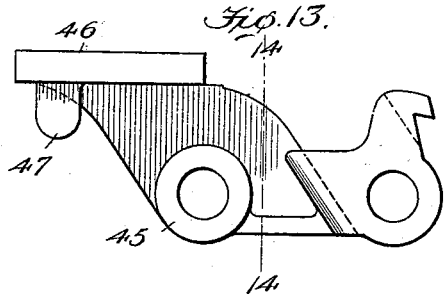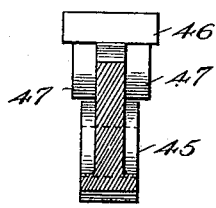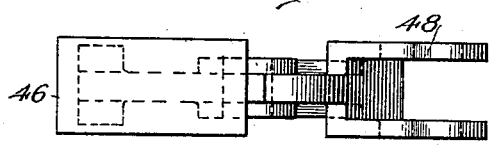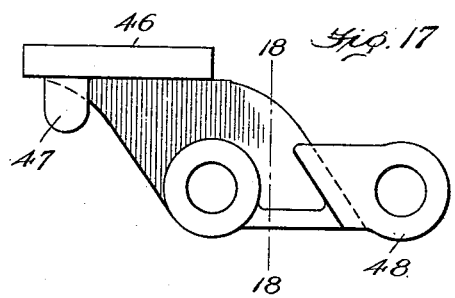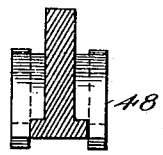

UNITED STATES PATENT OFFICE.

DORSEY F. ASBURY, OF WASHINGTON, DISTRICT OF COLUMBIA.

CHAIN RAMMER.

980,181.   Specification of Letters Patent.   Patented Jan. 3, 1911.

Application filed August 19, 1909. Serial No. 513,571.

*To all whom it may concern:*

Be it known that I, DORSEY F. ASBURY, a citizen of the United States, residing at Washington, in the District of Columbia, have invented certain new and useful Improvements in Chain Rammers; and I do hereby declare the following to be a full, clear, and exact description of the invention, such as will enable others skilled in the art to which it appertains to make and use the same.

My invention relates to the construction of a beam or the like consisting of a series of connected links which are adapted to interlock to form a continuous, rigid structure that is especially suitable for use as a rammer for guns, and the principal objects of the invention are to afford a structure of this character in which the links directly interlock and independent link-locking devices are rendered unnecessary, to provide a strong and durable link which is of the lightest form per unit of length, and to so form the links that they may be easily and cheaply made.

When embodied in a rammer for guns, my invention provides a self sustaining rammer chain that affords simple and certain means for supporting the rammer head during its travel across the ammunition car space in the rear of the breech of the gun and across the gas check seat within the gun chamber, that efficiently withstands stresses and wear incident to ramming, and that compensates for wear of the links without permitting any abnormal sag in the chain.

In the drawings chosen for the purpose of illustrating my invention, the scope whereof is pointed out in the claims, Figure 1 is a view, partly in central section and partly in elevation in the plane of inclination of the device, illustrating a rammer for guns embodying my invention, the rammer chain being illustrated in a partly extended position and a portion of a gun being also shown; Fig. 2 is a vertical section of the rammer mechanism, taken in the plane of the line 2—2, Fig. 1; Fig. 3 is a detail, side elevation of a series of connected, interlocking links such as are preferably employed to form the forward portion of the rammer chain, one of the links being shown in unlocked position; Fig. 4 is a detail elevation of the rear end of the rammer head shank and its engaging links; Fig. 5 is a detail elevation of a portion of the rammer chain, showing the relation of the last two links in the self sustaining section of the chain to each other and to preceding and following links, the parts being in the positions they occupy when ramming; Fig. 6 is a detail, plan view of the preferred form of one of the interlocking links; Fig. 7 is a side elevation of the link shown in Fig. 6; Fig. 8 is a detail, vertical section of one of the interlocking links, taken in the plane of the line 8—8, Fig. 7; Fig. 9 is a detail, perspective view of the interlocking link illustrated in Figs. 6, 7 and 8; Fig. 10 is a detail view in side elevation illustrating the manner of mounting the rollers on the joint pins by which the links are connected; Fig. 11 is a detail view, partly in section and partly in elevation, also illustrating the manner of mounting the rollers on the joint pins; Fig. 12 is a detail, plan view of the last link in the self sustaining section of the rammer chain; Fig. 13 is a detail side elevation of the link shown in Fig. 12; Fig. 14 is a detail, vertical section, taken in the plane of the line 14—14, Fig. 13; Fig. 15 is a detail, side elevation of the rear portion of the link which controls the vertical movements of the rammer head; Fig. 16 is a detail, plan view of one of the links forming the section of the rammer chain which is not self sustaining; Fig. 17 is a detail, side elevation of the link shown in Fig. 16; Fig. 18 is a detail vertical section taken in the plane of the line 18—18, Fig. 17; Fig. 19 is a cross-section of the rammer chain housing or rammer beam, the view being taken in the plane of the line 19—19, Fig. 1; Fig. 20 is a cross-section of the rammer chain housing, taken in the plane of the line 20—20, Fig. 1; Figs. 21, 22 and 23 are detail views showing in plan, side elevation and end elevation, respectively, a modified form of interlocking link embodying my invention; and Fig. 24 is a detail, side elevation of a connected series of the links illustrated in Figs. 21, 22 and 23, one of the links being shown in unlocked position.

Like symbols refer to like parts wherever they occur.

I will now proceed to describe my invention more fully, so that others skilled in the art to which it appertains may apply the same.

In the drawings, 1 is the breech of a gun, 2 the gun slide and 3 the gun yoke. The details of construction of these parts, which form no part of my present invention, may be of any well known or suitable character.

In order to economize space, the rammer beam 4, which forms a guide and housing for the rammer chain, is rigidly mounted upon the gun slide 2 and extends rearwardly therefrom, the portion of the beam which is adjacent to the gun being straight, as at 4ª, for a distance sufficient to house the non-interlocking links of the rammer chain, and the rear end portion 4ᵇ of said beam being suitably curved for a sufficient distance to accommodate the self sustaining or interlocked section of the chain. Both the straight portion 4ª and the curved portion 4ᵇ of the rammer beam are provided with oppositely disposed supporting faces or tracks upon which the anti-friction, supporting rollers 61 and 62 of the rammer chain travel, the rectilinear tracks 4ᶜ being preferably formed integral with the straight portion 4ª of the rammer beam 4 and the curvilinear tracks 4ᵈ being, for convenience, formed by a curved guard member or shield 4ᵉ that is attached to the curved portion 4ᵇ of the rammer beam and serves to prevent accidental contact with the rammer chain.

As shown in Fig. 2, the rammer beam is inclined to the vertical at a sufficient angle to permit an ammunition car to pass to and from a loading position at the rear of the gun.

Adjustably mounted upon the rear end of the rammer beam 4 by means of a pivot pin 5 is a casing 6 in which are mounted the sprocket wheels 7 by means of which the rammer chain is operated.

The vertical adjustment of the sprocket casing 6 is accomplished through the instrumentality of a supporting bar or beam 8 the lower end of which is pivotally mounted on the rammer beam at 9 and the upper end of which is perforated to receive the pin 10ª of an adjusting lever 10 that is provided with an eccentric which rotates within lugs 6ª with which the sprocket casing is provided. As shown in dotted lines in Fig. 1, the sprocket casing 6 is provided with a series of holes into which, and through the perforated upper end of the adjusting lever 10, a pin may be passed to thus maintain the supporting bar 8 in the desired position with respect to the gun chamber.

In order to assist in maintaining the proper lateral alinement of the sprocket casing and rammer chain, it is preferred to employ a guide 11 having a bifurcated end 11ª that receives the flange 8ª of the supporting beam 8, the said guide being bolted at 12, 12ª and 12ᵇ to a bracket 4ᶠ which is integral with the rammer beam 4 adjacent to the casing 6.

The sprocket casing 6, which is preferably furnished with a removable plate or cover 6ᵇ that permits the introduction of the sprockets 7 and also prevents contact of the person with the rammer chain, is provided at the top, and slightly forward of the sprocket wheel shaft, with an open ended box or frame 6ᶜ in which a supporting roller 13 is journaled on a pin or shaft 14. This roller is adapted to engage the tops of the interlocking links of the rammer chain to support the latter in an extended position, as will hereinafter appear.

The upper, forward portion of the casing is extended toward the gun, as at 6ᵈ, to form a guide for the rammer chain and rammer head shank, the lower part of said guide being somewhat wider than the upper part to accommodate the rollers with which the rammer chain is provided, and the lower face of said guide being provided with a wear plate or roller path 15 having a raised portion 15ª that is sufficiently long to insure a support for at least one of the rollers of the rammer chain during the passage of the said chain thereover. As shown in Fig. 1, when the interlocking section of the rammer chain is passing through the guide 6ᵈ said section is supported in a horizontal position by the conjoint action of the roller 13, which engages the top surfaces of the interlocked links, and the raised portion 15ª of the roller path, which engages the antifriction rollers of the chain from beneath, the location of the roller engaging portion 15ª of the roller path at the forward end or mouth of the guide 6ᵈ serving to afford the roller 13 a large leverage in supporting this section of the rammer chain.

The parallel sprocket wheels 7 by which the rammer chain is actuated are arranged in inclined planes corresponding to the inclination of the rammer beam 4 and are preferably integrally united by means of a sleeve 7ª which maintains the said sprocket wheels in proper position to permit the teeth thereof to have driving engagement with the antifriction rollers 61 and 62 mounted on the opposite sides of the rammer chain. These sprocket wheels are mounted upon and driven by a shaft 16 which is journaled in the casing 6 and which is preferably provided at one end with a bevel gear 17 that meshes with a bevel pinion 18 which is slidably but non-rotatably, mounted upon a driving shaft 19. The bevel gears 17 and 18 may, if desired, be inclosed by a divided casing formed of two bolt connected sections 20.

Rigidly secured to the face plate 21ª at the forward end of the shank 21ᵇ of the rammer head is a rammer head 21 which is preferably formed of a light, non-sparking material, such as aluminum, and which is provided with antifriction roller devices 22 that are adapted to roll upon the lower surface of the gun chamber to thus support the forward end of the rammer chain during any desired travel of the said rammer head within the gun.

The rammer head shank 21<sup>b</sup>, which is preferably of steel and formed as an I beam in cross-section, may, for the sake of lightness, have a channeled top surface and holes through its web, as shown in Figs. 1 and 2. The rear end of the rammer head is preferably of precisely the same form as the rear ends of the interlocking links constituting the self sustaining section of the rammer chain, which will now be described.

Except as hereinafter described, each interlocking element of the self sustaining section of the rammer chain is preferably formed as an integral link member 23 having a central, web-like body portion 24 at the lower part of which is a lateral, reinforcing web 25 that extends forwardly from the circular boss around the pivot pin hole 26 to form a brace for the bifurcated or female forward end of the link. The forward end of the member 23, which, when the chain is supporting a load is designed to engage and interlock with the rear or male end of a similar link, is preferably fashioned with a pair of locking members which are formed as forwardly extending, parallel hooks 27 having inwardly projecting portions 28 that afford an extended bearing or clamping surface for the mating locking devices formed at the rear end of another link member, the extensions 28 of the locking hooks 27 being spaced apart sufficiently far to receive the body web 24 of the preceding link member and afford lateral support therefor. The lower portion of each forward locking hook 27 is perforated, as at 29, to receive a pivot pin which is adapted to pass through the pin hole 26 formed in the preceding link member 23 of the rammer chain, the several links being thus assembled to form a continuous chain, as will be readily understood.

At the top of the body web 24 of each link element 23 is a thrust member 30 having oppositely disposed, parallel guide faces 31 which are adapted to slidingly engage the corresponding interior faces of the rammer chain guide 6<sup>d</sup> to thus prevent lateral movement of the rammer chain. The front and rear abutment faces 32 and 33, respectively, of the thrust member are normal to the direction of length of the interlocked chain and their distance apart is equal to the distance from center to center of the pin holes 26 and 29, so that, during a ramming operation, each forward face 32 engages the preceding rear face 33 and the shock and rearward thrust imparted to the rammer chain in forcing the ammunition into the gun chamber is principally transmitted through the thrust members 30, the mating interlocking hooks being thus substantially relieved from this source of strain. The abutment faces 32 and 33 also operate to prevent the rammer chain from sagging when extended, as will be readily understood.

In order to prevent the rammer chain from sagging even when, from long usage, the battering of the faces 32 and 33 against each other and the elongation of the pivot pin holes 26 and 29, as well as the wear of the pivot pins passing therethrough, may have, in effect, shortened the chain along its top and increased its length at the bottom, each link member 23 is preferably provided with supporting faces 34 and 35 which lie in a plane parallel to the direction of length of the rammer chain when extended, the face 34 being conveniently formed at the upper portion of the body web 24 adjacent to the front abutment face 32 and the face 35 being preferably formed at the lower surface of the thrust member 30 to the rear of the central web 24. With this construction sagging of the rammer chain due to wear is prevented, as such wear is compensated for by the faces 35 sliding over the supporting faces 34, the latter faces, it will be noted, being located well to the rear of their respective pivot pin holes 29 to thus afford a large leverage to resist such tendency to sag.

The rear end of each link member 23 is provided with locking devices 36 which are adapted to interlockingly engage the locking members 27 of another link. These locking devices 36, which may extend downwardly from the thrust member 30 just forward of the sag preventing face 35, are preferably formed as a pair of rearwardly facing, parallel hooks which are spaced apart sufficiently far to receive the central body web 24 of the next link to the rear, lateral rigidity being thus imparted to the chain.

As the principal strains which the locking hooks 27 and 36 have to resist are those due to the weight of the chain itself, it is preferred to lighten the link member by forming a depression 37 in the upper face of the thrust member 30, enough metal being left at the sides, however, to form bearing faces 38 which are adapted to engage the supporting roller 13.

The front and rear faces 39 and 40, respectively, of the body portion of each link member 23 are preferably parallel so as to lie closely adjacent to each other when the chain is extended, and, for convenience of machining, the rear faces 41 of the locking hook projections 28 are preferably parallel to the oppositely lying portion of said front face 39.

For the purpose of gradually lowering the rollers 22 to permit them to engage the lower surface of the gun chamber and thus support the rammer head 21 after the latter has moved inwardly beyond the gas check seat, and also for the purpose of lifting the rammer head rollers 22 over the gas check seat when the rammer is withdrawn, it is preferred to insert at the appropriate point in the rammer chain an interlocking link 42 which is provided with a thrust member 43 the top surface whereof slopes downwardly from front to rear, as shown in Fig. 15. This link 42, which, except for the tapered or inclined form of the thrust member 43, is exactly like the final interlocking link illustrated in Figs. 12, 13 and 14 and presently to be described, causes the rammer head supporting rollers to traverse the path indicated by the dotted line 44 in Fig. 1, the outward passage of the said inclined thrust member under the supporting roller 13 permitting the rammer head to lower and its inward passage causing the rammer head to be elevated, as will be readily understood.

The final, rear, interlocking link 45 of the self sustaining section of the rammer chain is preferably constructed exactly like the interlocking link members 23 heretofore described, except that the thrust member 46 has a plane top and is of decreased height to permit it to clear the supporting roller 13 without causing the rammer head rollers 22 to be lifted from supporting engagement with the gun, and except also that parallel, spaced lugs or bosses 47, which receive and laterally brace the central body web of the next following link, are substituted for the rear locking hooks 36.

As it is only necessary to make the self sustaining portion of the rammer chain of sufficient length to extend from the supporting roller 13 to the point in the gun chamber where the rammer head rollers 22 engage the gun to support the forward end of the chain, the rear section of the rammer chain is preferably composed of links 48 which do not interlock, since the use of such non-interlocking links, which may readily assume a rectilinear arrangement after moving inwardly around the sprocket wheels 7, permits the space economizing form of rammer beam 4 to be employed. These links, as shown in Figs. 16, 17 and 18 may be, and preferably are, of precisely the same form as the link elements 23, except that the forward locking hooks 27, which are unnecessary, are omitted, and a thrust member 46 and web bracing bosses 47 corresponding to the parts indicated by like reference characters in Figs. 12, 13 and 14 are substituted for the thrust member 30 and rear locking hooks 36 of the interlocking link 23. If desired, the rear end of the final link 48 may, as shown in Fig. 1, be formed with a flat, transversely extending, buffer face 48$^a$.

The first interlocking link 65 of the chain is preferably of exactly the same form as the link 48, except that rear locking hooks, such as 36 in Figs. 6, 7, 8 and 9, are substituted for the bracing bosses 47.

Figs. 21 to 24, inclusive, illustrate a modified form of interlocking link 49 which is especially designed to be made of cast metal, the several forms of links heretofore described being preferably machined from drop forgings having the approximate outline of the link 45 shown in Figs. 12, 13 and 14. In this modified construction the rear portion of each interlocking link 49 is formed as a pair of parallel webs 50 which permit the passage and engagement of the proximate forward and rear locking hooks or devices 51 and 52, respectively. The rear, upper portions of the upright body webs 50 are connected and braced by a top plate forming a thrust member having front and rear, transverse abutment faces 53 and 54, respectively, which transmit the principal strains due to ramming, as previously explained. The top surface 55 of the thrust member is adapted to engage the supporting roller 13 as the rammer chain is projected and withdrawn, while the outside surfaces of the webs 50 form parallel guide or bearing faces which slidingly engage the corresponding interior faces of the rammer chain guide 6$^d$ to maintain the lateral alinement of the chain. To prevent sag due to wear, supporting faces 56 and 57, which lie in a plane parallel to the direction of length of the rammer chain when extended, are employed. These supporting faces, which are preferably located well to the rear of the forward pivot pin hole 58 correspond in function and substantially in location to the supporting faces 34 and 35 with which the preferred form of interlocking links 23 are provided. The rear pivot pin holes 59, which are formed in the webs 50, receive the pivot pin by which the link is connected to the forward end of the succeeding link. It will be noted in the modified form of construction that the male forward ends of the links 49 are received between the body webs 50 forming the female ends of the said links, the locking hooks 51 and 52, when in locking engagement, being thus protected and concealed within the chain beam. In the preferred form of construction the forward ends of the interlocking links 23 are divided and the body webs 24 pass between the locking hooks 27, the rear end of each link thus being male and the forward end being female. In assembling the chain, the forward end of each link is pivotally attached to the rear end of the next preceding one by means of a pivot pin 60. The forward end of the first interlocking link is similarly connected to the rear end of the rammer head shank 21$^b$, which, as heretofore stated, preferably corresponds in form with the rear end of one of the interlocking links, and has therefore, been identified by corresponding reference characters. For the purpose of permitting the easy and rapid operation of the rammer chain, as well as to decrease wear, it is preferred to mount antifriction rollers 61 and 62 upon each pivot pin 60 on opposite sides of the link elements, said rollers being adapted to have driving engagement with the teeth of their respective sprocket wheels 7 and being also adapted to roll upon the raised portion 15ª of the roller path 15 at the outer end of the rammer chain guide 6ᵈ. As shown in Fig. 2, the flat, outer faces of these rollers preferably engage the adjacent inner faces of the chain guide 6ᵈ and thus assist in maintaining the lateral alinement of the rammer.

Figs. 10 and 11 illustrate simple and efficient means for maintaining the antifriction rollers upon the joint pins 60. As there shown, it is preferred to form the outer face of the roller 61 with a countersunk seat which receives the headed end of the joint pin, the outer face of the opposite roller 62 being countersunk, as at 62ª, to permit the rotation of a dove-tailed key 63, and being slotted from its periphery inwardly to said counter-sink, as at 62ᵇ, in order to permit the key 63 to be driven into the corresponding dove-tailed slot or key-seat 60ª formed in the end of the joint pin. The dovetailed key 63 may be conveniently retained in its seat by means of a counter-sunk rivet 64 which passes longitudinally through the pivot pin 60.

The construction and arrangement of the several parts of the mechanism being substantially such as hereinbefore pointed out, the operation of the rammer will be as follows: When the rammer head 21 is projected outwardly toward and into the gun chamber by a proper rotation of the sprocket wheels 7, the forward locking devices of each interlocking link are brought into locking engagement with the mating locking devices at the rear end of the second link ahead, the interlocked chain beam being thus built up from the rear as the successive links pass outwardly around the sprocket-wheels, and the locking rotation of each link being executed around a pivotal point or joint pin 60 which is distinct and spaced from the pivotal point or joint pin at the proximate end of the second link ahead. Thus, when the self sustaining section of the rammer chain is composed of links such as 23, the forward locking hooks 27 of each of said links will interlock with the rear locking hooks 36 of the second link ahead, and if interlocking links such as 49 be employed for this section of the chain, the forward locking hook 51 of each link will similarly interlock with the rear locking hook 52 of the second link ahead. When thus interlocked, the links of this section of the chain form a rigid, self sustained beam which, when properly supported at one end by suitable means, such, for example, as the supporting roller 13 and the outer portion 15ª of the roller path, may be projected across the space at the rear of the gun, to thus certainly and efficiently support and direct the rammer head. As shown more particularly in Figs. 1, 3, 4 and 5, after the interlocking links have been assembled into a beam by passing outwardly around the sprocket wheels, the engaging thrust members at the tops of the links prevent the beam from buckling downward, while the engagement of the several mating locking-hooks prevents the beam from buckling in the opposite direction, and the lateral rigidity of the beam is maintained by the interengagment of the ends of the links, as heretofore explained.

When the link 42, which is provided with the tapered thrust member 43, passes under the supporting roller 13, the rammer head supporting rollers 22 are lowered to engage the surface of the gun chamber, as previously explained. As the non-interlocking links pass around the sprockets 7 and are brought into alinement with the self sustaining section of the rammer chain, their top surfaces clear the supporting roller 13, thus permitting the rammer head supporting rollers 22 to continue to roll upon the surface of the gun chamber. The antifriction rollers 61 and 62, with which these links 42 are also provided, roll upon and are supported by the raised portion 15ª of the roller path 15 as they pass out of the rammer chain guide 6ᵈ, so that when the rammer head is within the gun chamber and is supported by the gun, the rammer chain acts as a beam supported at its ends.

When the sprocket wheels 7 are rotated in the proper direction to withdraw the rammer chain from the gun chamber, the links are drawn rearwardly through the guide 6ᵈ, pass around the sprocket wheels and are forced rearwardly in the housing or rammer beam 4, the supporting rollers 22 being lifted out of engagement with the interior of the gun as the transition link 42 passes under the supporting roller 13 and the rammer head 21 being drawn rearwardly until its shank enters and is housed by the rammer chain guide 6ᵈ. As the several interlocking links of the self-sustaining section of the rammer chain pass inwardly around the sprocket wheels 7 they are successively rotated rearwardly, thus disengaging the mating locking hooks, as will be readily understood upon reference to Figs. 1 and 3.

Having thus described my invention, what I claim and desire to secure by Letters Patent is:

1. A device of the character indicated comprising a series of flexibly connected links, the links of said series being provided with rigidly attached mating members that are adapted to engage and interlock.

2. A device of the character indicated comprising a series of flexibly connected links, the links of said series being provided with rigidly attached mating members that are adapted to engage and interlock, said links being formed with inter-engaging ends.

3. A device of the character indicated comprising flexibly connected links provided with rigidly attached mating locking members which are adapted to engage and interlock, the locking members upon links which are spaced from each other being adapted to interlock.

4. A device of the character indicated comprising a series of flexibly connected links provided with locking members, the alternate links of said series being adapted to be interlocked by said locking members.

5. A device of the character indicated comprising a series of flexibly connected links provided with means for rigidly locking said links together to form a beam, said links being provided with supporting faces lying in a plane parallel to the direction of length of the said beam and the supporting face on one link being adapted to engage the supporting face on another link.

6. A device of the character indicated comprising a series of flexibly connected links provided with means whereby said links may be rigidly locked together, each of said links being provided with supporting faces which engage and are adapted to slide upon co-acting supporting faces of adjacent links, said supporting faces extending in the direction of length of the links when interlocked.

7. A device of the character indicated comprising a series of flexibly connected links, each link having a plurality of locking hooks that are adapted to engage and interlock with locking hooks upon other links of the series.

8. A device of the character indicated comprising a series of flexibly connected links, each link being provided with a plurality of rigidly attached locking hooks, a thrust member having front and rear abutment faces, and supporting faces arranged parallel to the direction of length of the link.

9. A device of the character indicated comprising a series of flexibly connected links, each link having a body web, a lateral reinforcing web, a plurality of locking hooks which face in opposite directions, a thrust member having front and rear abutment faces, and supporting faces arranged parallel to the direction of length of the link.

10. A device of the character indicated comprising flexibly connected links which are provided with rigidly attached locking members that are adapted to engage and interlock, said links having anti-friction rollers journaled upon opposite sides thereof.

11. In a rammer, the combination with a rammer head and a rammer head shank provided with a locking member, of a rammer chain having flexibly connected links provided with rigidly attached locking members that are adapted to engage and interlock, one of said links being adapted to engage and interlock with the locking member of said shank.

12. In a rammer, the combination with a rammer head, of a rammer chain connected thereto, mechanism for operating said chain, and means for supporting said chain, said rammer chain having a series of flexibly connected links provided with rigidly attached locking members which are adapted to engage and interlock.

13. In a rammer, the combination with a rammer head, of a rammer chain connected thereto, mechanism for operating said chain, and a housing for said chain, said rammer chain being composed of a series of flexibly connected links a part only of which are provided with rigidly attached mating members that are adapted to engage and interlock, and said housing comprising straight and curved portions, the curved portion of said housing being adapted to receive links provided with said rigidly attached mating members.

14. In a rammer, the combination with a rammer head, of a rammer chain connected thereto, mechanism for operating said chain, means for supporting the chain, and means carried by said chain for lowering and raising the rammer head at a predetermined point in its travel.

15. In a rammer, the combination with a rammer head, of supporting rollers mounted thereon, a rammer chain connected to said rammer head, mechanism for operating said chain, means for supporting said rammer head and chain back of the breech of the gun to which it is to be applied, and means carried by said chain for causing said supporting rollers to move into and out of engagement with the gun while within the chamber thereof.

16. In a rammer, the combination with a rammer head, of a rammer chain connected thereto, said chain comprising a series of flexibly connected links which are provided with rigidly attached locking members that are adapted to engage and interlock, a roller adapted to bear upon one side of said chain when the links thereof are interlocked, and means located upon the opposite side of the chain for supporting the chain.

17. In a rammer, the combination with a rammer head, of a rammer chain connected thereto, said rammer chain comprising a series of flexibly connected links each of which is provided with a thrust member, and means adapted to engage the top surfaces of some of the thrust members of said links to support said chain, the top surfaces of some of said thrust members when the links are in alinement being in a different plane from the top surfaces of other of the thrust members.

18. In a rammer, the combination with a rammer head, of a rammer chain connected thereto, joint pins for connecting the link members of said chain, each of said joint pins having a key-way therein, and a key in each of said key-ways.

19. In a rammer, the combination with a rammer head, of a rammer chain connected thereto, means for supporting said chain in an extended position, and means for actuating said rammer chain, said chain being composed of a series of flexibly connected links having thrust members that are adapted to engage each other, the thrust member of one of said links having an inclined bearing face which is adapted to engage said supporting means to thereby cause the extended chain to be raised and lowered.

20. In a rammer, the combination with a rammer head, of a rammer chain having flexibly connected links provided with rigidly attached locking members which are adapted to engage and interlock, a plurality of sprocket wheels for actuating said chain, antifriction rollers journaled on said chain, a roller path for supporting said antifriction rollers, and a supporting roller adapted to engage the interlocking links.

21. In a rammer, the combination with a rammer head, of a rammer chain connected thereto, mechanism for operating said chain, a rammer beam forming a housing for said chain, a rammer chain guide pivotally mounted on said rammer beam, a supporting bar pivotally mounted on the rammer beam, and a rotatable member connecting said guide and said supporting bar, said rotatable member being provided with an eccentric.

22. A rammer chain link having a body web, a lateral reinforcing web, a thrust member formed with forward and rear abutment faces, and separated bosses extending from said thrust member toward said reinforcing web.

23. A rammer chain link provided with means whereby it may be pivotally connected to a plurality of other links to form a chain, and also provided with a plurality of supporting faces arranged parallel to its direction of length, the supporting faces of said link being adapted to engage and disengage mating supporting faces of adjacent links pivotally connected thereto.

In testimony whereof I affix my signature, in presence of two subscribing witnesses.

DORSEY F. ASBURY.

Witnesses:
OTIS B. JOHNSON,
M. JOHNSON.